(12) United States Patent
Diaz et al.

(10) Patent No.: US 9,914,448 B2
(45) Date of Patent: Mar. 13, 2018

(54) CONTROL OF MULTIPLE TORQUE ACTUATORS ACROSS AT LEAST TWO CONTROLLERS IN A POWERTRAIN ASSEMBLY

(71) Applicant: GM GLOBAL TECHNOLOGY OPERATIONS LLC, Detroit, MI (US)

(72) Inventors: Michael G. Diaz, Ann Arbor, MI (US); Ryan Z. Goode, Howell, MI (US); Kevin J. Storch, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 72 days.

(21) Appl. No.: 15/186,595

(22) Filed: Jun. 20, 2016

(65) Prior Publication Data
US 2017/0361828 A1   Dec. 21, 2017

(51) Int. Cl.
*B60W 20/10*   (2016.01)
*B60W 10/06*   (2006.01)
(Continued)

(52) U.S. Cl.
CPC ............. *B60W 20/10* (2013.01); *B60K 6/42* (2013.01); *B60W 10/06* (2013.01); *B60W 10/08* (2013.01); *B60W 30/188* (2013.01); *B60W 50/06* (2013.01); *B60W 2050/0026* (2013.01); *B60W 2050/0042* (2013.01); *B60W 2540/10* (2013.01); *B60W 2540/12* (2013.01); *B60W 2710/0666* (2013.01); *B60W 2710/083* (2013.01); *B60Y 2200/92* (2013.01); *B60Y 2300/188* (2013.01); *B60Y 2300/43* (2013.01); *B60Y 2300/60* (2013.01); *Y10S 903/93* (2013.01)

(58) Field of Classification Search
CPC ...... B60W 20/10; B60W 10/06; B60W 10/08; B60W 30/188; B60W 50/06; B60W 2050/0026; B60W 2050/0042; B60W 2540/10; B60W 2540/12; B60W 2710/0666; B60W 2710/083; B60K 6/42; B60Y 2200/92; B60Y 2300/188; B60Y 2300/60; Y10S 903/93
See application file for complete search history.

(56) References Cited

U.S. PATENT DOCUMENTS

| 2003/0097215 | A1* | 5/2003 | Riedle | F02D 11/105 701/110 |
| 2014/0162838 | A1* | 6/2014 | Doering | B60W 20/40 477/5 |
| 2015/0151737 | A1* | 6/2015 | Birch | B60W 10/06 701/22 |

* cited by examiner

Primary Examiner — Calvin Cheung
(74) Attorney, Agent, or Firm — Quinn IP Law

(57) ABSTRACT

A powertrain assembly has multiple torque actuators. The assembly includes a first controller configured to control a first torque actuator and a second controller configured to control a second torque actuator. The first controller is configured to receive a signal from an input sensor and convert the signal into a torque demand. The second controller is configured to receive the torque demand from the first controller and determine respective optimal torque allocations for the first and second torque actuators based on the torque demand and a plurality of optimization factors. The first controller includes a processor and tangible, non-transitory memory on which is recorded instructions for executing a method of controlling the multiple torque actuators across the at least two controllers via a dynamic look-up table. The dynamic look-up table is populated by a plurality of stored torque production allocation values based on a respective plurality of torque requests.

16 Claims, 2 Drawing Sheets

(51) Int. Cl.
*B60W 10/08* (2006.01)
*B60W 30/188* (2012.01)
*B60W 50/06* (2006.01)
*B60K 6/42* (2007.10)
*B60W 50/00* (2006.01)

CONTROL OF MULTIPLE TORQUE ACTUATORS ACROSS AT LEAST TWO CONTROLLERS IN A POWERTRAIN ASSEMBLY

TECHNICAL FIELD

The disclosure relates generally to a powertrain assembly, and more specifically, to control of multiple torque actuators across at least two controllers in a powertrain assembly.

BACKGROUND

Many powertrains are equipped with multiple torque actuators that are controlled by separate controllers but need to have a coordinated response to system requests and demands. Such a system may be slower in responding to a change in the system demands because of having to wait for communication between the separate controllers in coordinating a response.

SUMMARY

A powertrain assembly has multiple torque actuators, including a first torque actuator and a second torque actuator. The assembly includes at least two controllers including a first controller configured to control the first torque actuator and a second controller configured to control the second torque actuator. The first controller is configured to receive a signal from an input sensor and convert the signal into a torque demand. The second controller is configured to receive the torque demand from the first controller and determine respective optimal torque allocations for the first and second torque actuators based on the torque demand and a plurality of optimization factors. The first controller includes a processor and tangible, non-transitory memory on which is recorded instructions for executing a method of controlling the multiple torque actuators across the at least two controllers via a dynamic look-up table. The dynamic look-up table is populated by a plurality of stored torque production allocation values based on a respective plurality of torque requests.

The second controller is programmed to transmit the respective optimal torque allocations to the first controller. The first controller is programmed to determine if the respective optimal torque allocations determined by the second controller for the torque demand is available to the first controller. If the respective optimal torque allocations are not available to the first controller, the first controller is programmed to obtain an estimated optimal first torque value from the dynamic look-up table based on the torque demand and direct the first torque actuator to deliver the estimated optimal first torque value. If the respective optimal torque allocations are available to the first controller, the first controller is programmed to obtain an actual optimal first torque value for the first torque actuator based on the respective optimal torque allocations and direct the first torque actuator to deliver the actual optimal first torque value.

If the respective optimal torque allocations are available to the first controller, the first controller is programmed to update the plurality of stored torque production allocation values stored in the dynamic look-up table based on the respective optimal torque allocations for the torque demand.

The second controller may be programmed to obtain an optimal second torque output based on the respective optimal torque allocation for the second torque actuator and direct the second torque actuator to deliver the optimal second torque output. The assembly may include an energy storage system operatively connected to the first controller and configured to store electrical energy. A state-of-charge sensor is operatively connected to the energy storage system and configured to measure a current state-of-charge. The first controller may be programmed to update the plurality of stored torque production allocation values in the dynamic look-up table based on the current state-of-charge.

The above features and advantages and other features and advantages of the present disclosure are readily apparent from the following detailed description of the best modes for carrying out the disclosure when taken in connection with the accompanying drawings.

DETAILED DESCRIPTION

Figure 1:
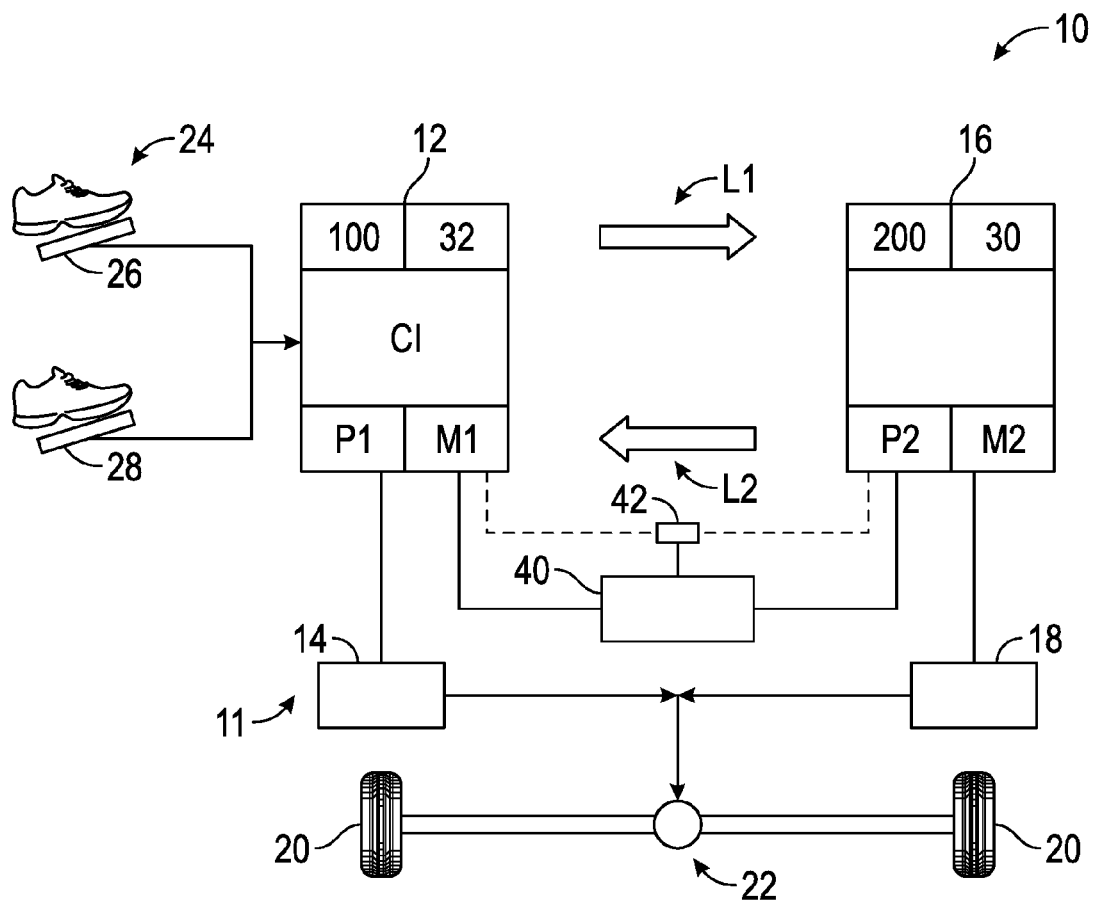
FIG. 1 is a schematic fragmentary view of a powertrain assembly having a first controller, a second controller, a first torque actuator and a second torque actuator.

Referring to the drawings, wherein like reference numbers refer to like components, FIG. 1 schematically illustrates a powertrain assembly 10. The powertrain assembly 10 may be part of a device 11. The device 11 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 11 may take many different forms and include multiple and/or alternate components and facilities.

Referring to FIG. 1, the assembly 10 includes a first controller 12, a first torque actuator 14, a second controller 16 and a second torque actuator 18. The first torque actuator 14 is configured to produce a first output torque and may be an internal combustion engine capable of combusting an air-fuel mixture in order to generate an output torque or any type of engine known to those skilled in the art. The second torque actuator 18 is configured to produce a second output torque and may be a relatively high-voltage, poly-phase electric machine or motor/generator or any other type of electric machine known to those skilled in the art that is capable of generating torque. The first and second torque outputs may be transmitted to wheels 20 via an axle member 22. In another example, the first torque actuator 14 is on one axle and the second torque actuator 18 is on another axle (not shown).

Referring to FIG. 1, the first and second controllers 12, 16 are each in communication, such as electronic communication, with various components of the assembly 10. The first controller 12 is configured to receive a signal from an input sensor 24, and convert the signal into a torque demand. The input sensor 24 may be operatively connected to an accelerator pedal 26, a brake pedal 28, or any other input device known to those skilled in the art. The first controller 12 may include any circuitry or electronic component known to those skilled in the art for receiving and processing input signals. The second controller 16 is configured to receive the torque demand from the first controller 12. The first controller 12 is configured to control the first torque actuator 14 and the second controller 16 is configured to control the second torque actuator 18. The second controller 16 does not directly control the first torque actuator 14 and the first controller 12 does not directly control the second torque actuator 18.

Referring to FIG. 1, the second controller 16 is programmed to determine respective optimal torque allocations for the first and second torque actuators 14, 18 based on the torque demand and a plurality of optimization factors, for example via an optimization module 30. As is understood by those skilled in the art, the determination of the respective optimal torque allocations is a non-trivial exercise and may involve upwards of 25 or more factors for consideration. The second controller 16 may employ any type of optimization module 30 known to those skilled in the art. The second controller 16 includes a processor P2 and memory M2, on which is recorded instructions for a method 200 (described in detail below with respect to FIG. 3) for executing the optimization module 30.

Because the second controller 16 does not control the first torque actuator 14 directly, the second controller 16 is programmed to transmit the respective optimal torque allocations to the first controller 12 so that it will adjust its actuator command (to the first torque actuator 14) appropriately. In the event of a sudden change in total axle torque request, for example due to a fast change in the brake pedal 28, there may be a relatively long delay, shown in FIG. 1 as first time lag L1 and second time lag L2, between the time the change in the brake pedal 28 occurs to when the optimal torque allocation for the first torque actuator 14 is updated and observed in the first controller 12. The first time lag L1 may include the time taken for the first controller 12 to convert the updated signal from the input sensor 24 into a total axle torque value, and transmit the updated total axle torque value to the second controller 16 over CAN or other network. The second time lag L2 may include time taken for the second controller 16 to receive the updated total axle torque value, process the updated total axle torque value in its optimization module 30 and transmit optimal torque allocations back over CAN or other networks to the first controller 12.

Referring to FIG. 1, the first controller 12 includes a processor P1 and memory M1, on which is recorded instructions for executing a method 100, described below with reference to FIG. 2, for controlling multiple torque actuators across two or more controllers, specifically during the first and second time lags L1 and L2. The first controller 12 includes a dynamic look-up table 32 populated by a plurality of stored torque production allocation values based at least partially on a respective plurality of torque requests. The first controller 12 is configured to obtain an estimated optimal first torque value from the dynamic look-up table 32 at the same instant that it is first reacting to a change in the total axle torque request, i.e., during the first and second time lags L1 and L2.

The methods 100, 200 are executed concurrently. Methods 100, 200 need not be applied in the specific order recited herein and it is to be understood that some steps may be eliminated. The execution of the methods 100 and 200 improves the functioning of the device 11 in many ways. If the first controller 12 immediately reacts to an increase in axle torque request without waiting for the second controller 16 to receive, interpret and update the optimal torque allocation for the first torque actuator 14, the first torque actuator 14 may be commanded to quickly increase in first torque output and then, after the first controller 12 has finally received the second controller 16's updated optimal torque allocation bring the first torque output quickly down (or vice versa). The method 100 reduces or eliminates high frequency torque command reversals. The method 100 allows a control system to support faster actuator response (e.g. engine) even when control of actuators is distributed among multiple controllers.

Figure 3:
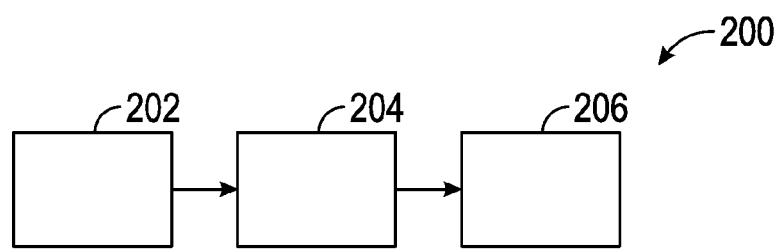
FIG. 3 is a flowchart for a method stored on and executable by the second controller of FIG. 1.

Referring now to FIG. 3, a flowchart of the method 200 stored on and executable by the second controller 16 of FIG. 1 is shown. Method 200 may begin with block 202, where the second controller 16 is configured to receive the torque demand from the first controller 12. In block 204, the second controller 16 is programmed to determine respective optimal torque allocations for the first and second torque actuators 14, 18 based on a plurality of optimization factors, via the optimization module 30. The second controller 16 is programmed to transmit the respective optimal torque allocations for the first and second torque actuators 14, 18 to the first controller 12. The method 200 then proceeds to block 206. In block 206, the second controller 16 is programmed to obtain an optimal second torque output based on the respective optimal torque allocation for the second torque actuator 18 and direct the second torque actuator 18 to deliver the optimal second torque output to the axle member 22.

Figure 2:
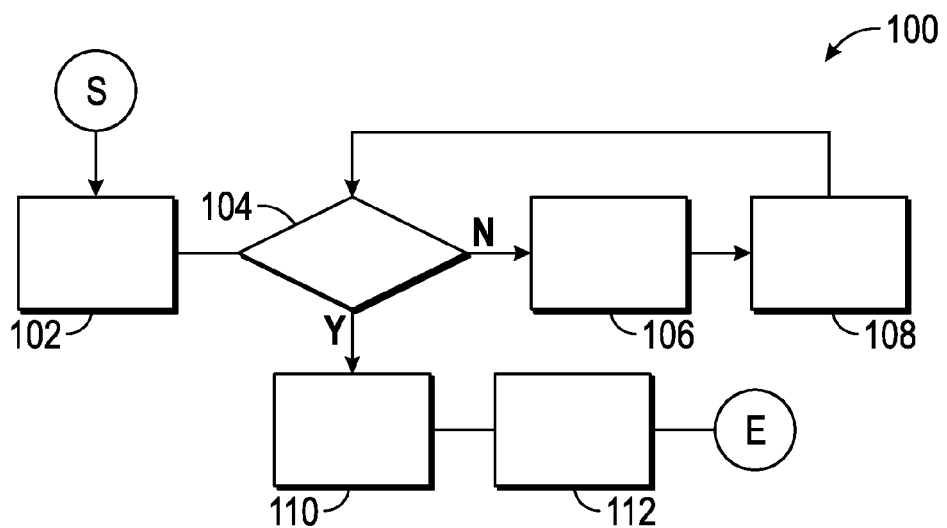
FIG. 2 is a flowchart for a method stored on and executable by the first controller of FIG. 1.

Referring now to FIG. 2, a flowchart of the method 100 stored on and executable by the first controller 12 of FIG. 1 is shown. The start and end of method 100 are shown by "S" and "E," respectively. Method 100 may begin with block 102, where the first controller 12 is programmed or configured to receive a signal from the input sensor 24, convert the signal into a total axle torque request, referred to herein as "torque demand," and transmit the torque demand to the second controller 16.

In block 104, the first controller 12 is programmed to determine if the respective optimal torque allocations determined by the second controller 16 (via the optimization module 30 in block 204 of FIG. 3) are available to the first controller 12, i.e., have already been received and processed by the first controller 12.

If the respective optimal torque allocations are not available to the first controller, the method 100 proceeds to block 106, where the first controller 12 is programmed to obtain an estimated optimal first torque value from the dynamic look-up table 32 based at least partially on the torque demand. In block 108, the first controller 12 is programmed to direct the first torque actuator 14 to deliver the estimated optimal first torque value to the axle member 22. The method 100 then loops back to block 104.

If the respective optimal torque allocations are available to the first controller 12, the method 100 proceeds from block 104 to block 110, where the first controller 12 is programmed to obtain an actual optimal first torque value for the first torque actuator 14 based on the respective optimal torque allocations from the optimization module 30 and direct the first torque actuator 14 to deliver the actual optimal first torque value. The method 100 then proceeds to block 112.

In block 112, the first controller 12 is programmed to update the plurality of stored torque production allocation values stored in the dynamic look-up table 32 based on the respective optimal torque allocations for the torque demand. This ensures that no steady state optimization of the first torque actuator 14 is ignored, i.e., the values in the dynamic look-up table are dynamically updated appropriately in the ensuing communication between the first and second controllers 12, 16 such that the first torque actuator 14 is still ultimately steered to the same optimal operation point that the optimization module 30 of the second controller 16 desires.

Referring to FIG. 1, the assembly 10 may include an energy storage system 40, such as a battery, operatively connected to the first and second controllers 12, 16 and configured to store energy. The energy storage system 40 may be a lead-acid battery or any type of energy storage system known to those skilled in the art. A state-of-charge sensor 42 may be operatively connected to the energy storage system 40 and configured to measure the state-of-charge of the energy storage system 40. The current state-of-charge may be defined as the ratio of the current capacity of the energy storage system 40 to its nominal capacity. The nominal capacity represents the maximum amount of charge that can be stored in the energy storage system 40. The state-of-charge sensor 42 may measure physical properties such as voltage and impedance. Alternatively, the first controller 12 may estimate the state-of-charge using discharging current as an input and integrating the discharging current over time. The state-of-charge sensor 42 may be a combination of a voltage and current sensor, with data fed into and modeled by the first controller 12. In one embodiment, the dynamic look-up table 32 is populated based only on the torque demand, as shown below in Table 1:

TABLE 1

| Torque Demand | Optimal Torque Allocation for First Torque Actuator |
|---|---|
| T1 | E1 |
| T2 | E2 |
| T3 | E3 |

In another embodiment, the dynamic look-up table 32 is populated based on torque demand as well as the state-of-charge of the energy storage system 40, as shown below in Table 2:

TABLE 2

| Torque Demand | State of Charge | Optimal Torque Allocation for First Torque Actuator |
|---|---|---|
| T1 | S1 | E11 |
| T1 | S2 | E12 |
| T1 | S3 | E13 |
| T2 | S1 | E21 |
| T2 | S2 | E22 |
| T2 | S3 | E23 |
| T3 | S1 | E31 |
| T3 | S2 | E32 |
| T3 | S3 | E33 |

The initial values of the dynamic look-up table 32 may be obtained via calibration or in any type of test cell or laboratory.

Figure 4:
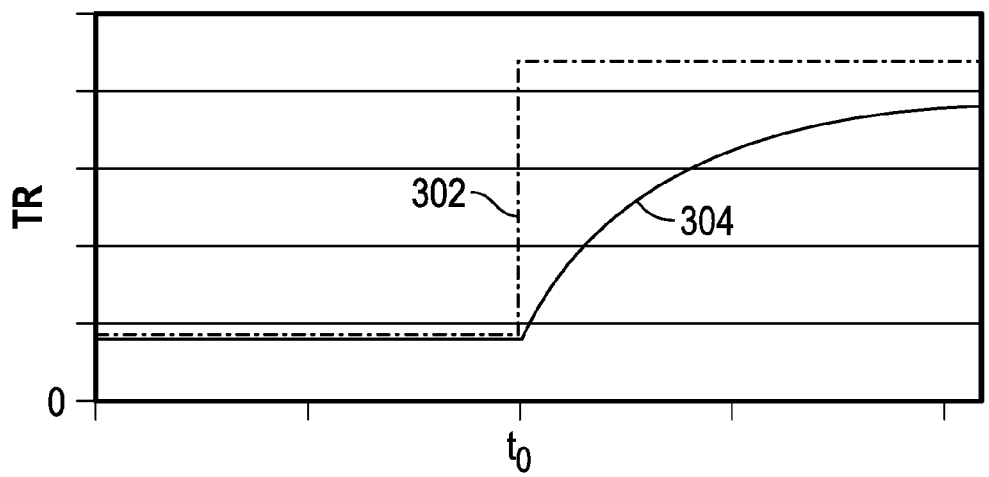
FIG. 4 shows an example graph of torque demand over time.

Referring now to FIG. 4, an example graph of torque demand 302 over time (t) is shown. The vertical axis represents units of torque (TQ), such as Newton meters, while the horizontal axis represents time (t). At time $t_0$, there is a sudden increase in the torque demand 302, for example, corresponding to a sudden step on the accelerator pedal 28. Prior to that point, the torque demand 302 is in a steady state. Curve 304 represents the shaped total axle torque target, computed by the first controller 12 in response to the torque demand 302.

Figure 5:
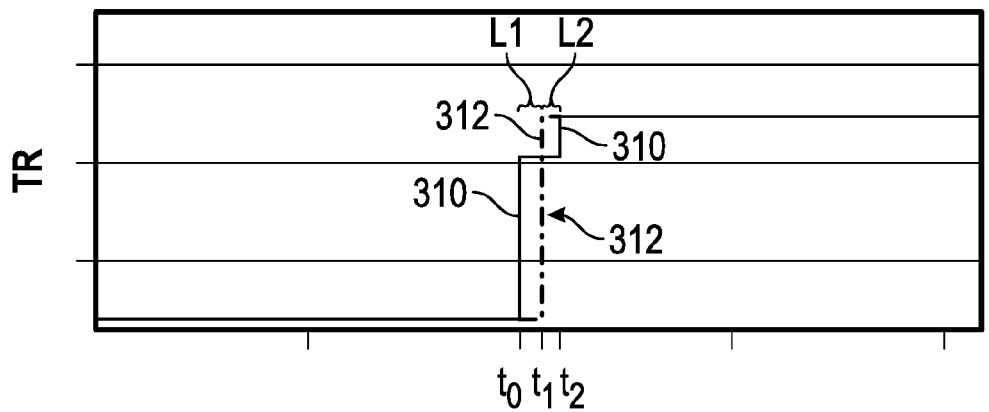
FIG. 5 shows an example first trace (solid line) of an estimated optimal first torque value (determined by the first controller of FIG. 1) and an example second trace (dashed line) of an actual optimal first torque value (determined by the second controller of FIG. 1).

Referring now to FIG. 5, the first trace 310 (solid line) shows the estimated optimal first torque value determined by the first controller 12, in response to the sudden increase in the torque demand 302 at time to. The first controller 12 has a fully populated dynamic lookup table 32 for a range of pedal-based torque requests. In a non-limiting example, when the torque demand is received at the time to, the first controller 12 immediately looks it up in its dynamic lookup table 32 and identifies 100 Nm (Newton Meters), for example, as the estimated optimal first torque value. The first controller 12 then commands the first torque actuator 14 accordingly for this estimate (100 Nm).

FIG. 5 shows an example second trace 312 (dashed line) showing the actual optimal first torque determined by the second controller 16. In a non-limiting example, at time $t_1$, the second controller 16 transmits an optimal torque allocation for the first torque actuator 14 as 120 Nm. At time t2, the first controller 12 commands the first torque actuator 14 based on the optimal torque allocation (120 Nm). The dynamic look-up 32 for this torque demand is updated from 100 Nm to 120 Nm. The first time lag L1 and the second time lag L2 are shown in FIG. 5.

The first and second controllers 12, 16 of FIG. 1 may be an integral portion of, or a separate module operatively connected to, other control modules of the device 11. The first and second controllers 12, 16 may each include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL)

in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain assembly comprising:
multiple torque actuators, including a first torque actuator and a second torque actuator;
at least two controllers, including a first controller configured to control the first torque actuator and a second controller configured to control the second torque actuator;
wherein the first controller is configured to receive a signal from an input sensor and convert the signal into a torque demand;
wherein the second controller is configured to receive the torque demand from the first controller and determine respective optimal torque allocations for the first and second torque actuators based on the torque demand and a plurality of optimization factors;
wherein the first controller includes a processor and tangible, non-transitory memory on which is recorded instructions for executing a method of controlling the multiple torque actuators across the at least two controllers via a dynamic look-up table; and
wherein the dynamic look-up table is populated by a plurality of stored torque production allocation values based on a respective plurality of torque requests.

2. The powertrain assembly of claim 1, wherein:
the second controller does not directly control the first torque actuator; and
the first controller does not directly control the second torque actuator.

3. The powertrain assembly of claim 1, wherein:
the second controller is programmed to transmit the respective optimal torque allocations to the first controller;
the first controller is programmed to:
determine if the respective optimal torque allocations determined by the second controller are available to the first controller;
if the respective optimal torque allocations are not available to the first controller, obtain an estimated optimal first torque value from the dynamic look-up table based on the torque demand; and
direct the first torque actuator to deliver the estimated optimal first torque value.

4. The powertrain assembly of claim 3, wherein the first controller is programmed to:

if the respective optimal torque allocations are available to the first controller, obtain an actual optimal first torque value for the first torque actuator based on the respective optimal torque allocations; and
direct the first torque actuator to deliver the actual optimal first torque value.

5. The powertrain assembly of claim 3, wherein the first controller is programmed to:
if the respective optimal torque allocations are available to the first controller, update the plurality of stored torque production allocation values stored in the dynamic look-up table based on the respective optimal torque allocations for the torque demand.

6. The powertrain assembly of claim 3, further comprising:
an axle member;
wherein the second controller is programmed to:
obtain an optimal second torque output based on the respective optimal torque allocation for the second torque actuator; and
direct the second torque actuator to deliver the optimal second torque output to the axle member.

7. The powertrain assembly of claim 3, further comprising:
an energy storage system operatively connected to the first controller and configured to store electrical energy;
a state-of-charge sensor operatively connected to the energy storage system and configured to obtain a state-of-charge; and
wherein the dynamic look-up table is populated based at least partially on the torque demand and the state-of-charge.

8. A method of operating a powertrain assembly having a first controller, a second controller, an input sensor, a first torque actuator controlled by the first controller and a second torque actuator controlled by the second controller, the method comprising:
receiving a signal from the input sensor and converting the signal into a torque demand, via the first controller;
sending the torque demand to the second controller, via the first controller;
determining respective optimal torque allocations for the first and second torque actuators, via the second controller;
conveying the respective optimal torque allocations to the first controller, via the second controller;
storing a dynamic look-up table in the first controller, the dynamic look-up table being populated by a plurality of stored torque production allocation values based on a respective plurality of torque requests.

9. The method of claim 8, further comprising:
determining if the respective optimal torque allocations determined by the second controller are available to the first controller, via the first controller;
if the respective optimal torque allocations are not available to the first controller, obtaining an estimated torque production allocation from the dynamic look-up table based on the torque demand, via the first controller;
obtaining an estimated first torque output for the first torque actuator based on the estimated torque production allocation and the torque demand, via the first controller; and
directing the first torque actuator to deliver the estimated first torque output.

10. The method of claim 9, further comprising:
if the respective optimal torque allocations are available to the first controller, obtaining an optimal first torque output for the first torque actuator based on the optimal torque production allocation and the torque demand, via the first controller; and
directing the first torque actuator to deliver the optimal first torque output, via the first controller.

11. The method of claim 10, further comprising:
if the respective optimal torque allocations are available to the first controller, updating the plurality of stored torque production allocation values stored in the dynamic look-up table based on the optimal torque production allocation for the torque demand, via the first controller.

12. The method of claim 10, further comprising:
obtaining an optimal second torque output for the second torque actuator based on the respective optimal torque allocations and the torque demand, via the second controller; and
directing the second torque actuator to deliver the optimal second torque output, via the second controller.

13. The method of claim 10, wherein the assembly includes an energy storage system configured to store electrical energy and a state-of-charge sensor configured to obtain a state-of-charge of the energy storage system, further comprising:
populating the dynamic look-up table is based at least partially on the torque demand and the state-of-charge of the energy storage system.

14. A vehicle comprising:
a first controller configured to receive a signal from an input sensor, the first controller being configured to convert the signal into a torque demand;
a second controller operatively connected to and configured to receive the torque demand from the first controller;
a first torque actuator controlled by the first controller and configured to produce a first output torque;
a second torque actuator controlled by the second controller and configured to produce a second output torque;
wherein the second controller does not directly control the first torque actuator and the first controller does not directly control the second torque actuator;
wherein the first controller includes a dynamic look-up table populated by a plurality of stored torque production allocation values based on a respective plurality of torque requests;
wherein the second controller is programmed to:
determine respective optimal torque allocations for the first and second torque actuators based on the torque demand and a plurality of optimization factors;
transmit the respective optimal torque allocations to the first controller;
wherein the first controller is programmed to:
determine if the respective optimal torque allocations determined by the second controller are available to the first controller; and
if the respective optimal torque allocations are not available to the first controller, obtain an estimated optimal first torque value from the dynamic look-up table based on the torque demand.

15. The vehicle of claim 14, wherein the first controller is programmed to:
if the respective optimal torque allocations are available to the first controller, obtain an actual optimal first torque value for the first torque actuator based on the respective optimal torque allocations; and
direct the first torque actuator to deliver the actual optimal first torque value.

16. The vehicle of claim 15, wherein the first controller is programmed to:
if the respective optimal torque allocations are available to the first controller, update the plurality of stored torque production allocation values stored in the dynamic look-up table based on the respective optimal torque allocations for the torque demand.

* * * * *